United States Patent
Takeshima et al.

(10) Patent No.: US 8,483,917 B2
(45) Date of Patent: Jul. 9, 2013

(54) BACKHOE LOADER (75) Inventors: Hiroaki Takeshima, Komatsu (JP); Yoshito Komatsu, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/817,204

(22) PCT Filed: Apr. 18, 2012

(86) PCT No.: PCT/JP2012/060456
§ 371 (c)(1),
(2), (4) Date: Feb. 15, 2013

(87) PCT Pub. No.: WO2013/021692
PCT Pub. Date: Feb. 14, 2013

(65) Prior Publication Data
US 2013/0144496 A1    Jun. 6, 2013

(30) Foreign Application Priority Data
Aug. 8, 2011  (JP) .................. 2011-172751

(51) Int. Cl.
*G06F 7/70* (2006.01)
(52) U.S. Cl.
USPC .......................................... 701/50
(58) Field of Classification Search
USPC .......................................... 701/50
See application file for complete search history.

(56) References Cited

U.S. PATENT DOCUMENTS

| | | | | |
|---|---|---|---|---|
| 6,923,285 B1* | 8/2005 | Rossow et al. | ................ | 180/272 |
| 7,296,404 B2* | 11/2007 | Pfaff | ............................... | 60/327 |
| 2003/0037940 A1* | 2/2003 | Howell, Jr. | ................... | 173/184 |
| 2005/0210871 A1* | 9/2005 | Lech et al. | ...................... | 60/422 |
| 2009/0171482 A1* | 7/2009 | Mindeman et al. | ............. | 700/83 |
| 2010/0162696 A1* | 7/2010 | Kakizawa et al. | ............. | 60/484 |
| 2012/0048409 A9* | 3/2012 | Sakamoto et al. | ....... | 137/565.29 |
| 2012/0067443 A1* | 3/2012 | Horii | ........................ | 137/599.01 |
| 2012/0096843 A1* | 4/2012 | Hennemann et al. | ........... | 60/327 |

FOREIGN PATENT DOCUMENTS

| | | |
|---|---|---|
| JP | 62-151654 A | 7/1987 |
| JP | 3-79369 U | 8/1991 |
| JP | 9-105137 A | 4/1997 |
| WO | 2006/098085 A1 | 9/2006 |
| WO | 2009/116249 A1 | 9/2009 |

OTHER PUBLICATIONS

International Search Report for PCT/JP2012/060456.

\* cited by examiner

*Primary Examiner* — Hussein A. Elchanti
(74) *Attorney, Agent, or Firm* — Global IP Counselors, LLP (57) ABSTRACT

A backhoe loader includes: a transmission; a cab including an operator's seat allowed to be forwardly and backwardly oriented; a loader disposed forwards of the cab; a backhoe disposed rearwards of the cab; a hydraulic pump configured to supply an operating oil to a hydraulic clutch; a hydraulic circuit including a relief valve for setting an intra-circuit hydraulic pressure to be a first hydraulic pressure; a work mode determining unit configured to determine whether or not an operating mode is a backhoe work mode using the backhoe; and a relief valve controlling unit. The relief valve controlling unit is configured to control a relief pressure of the relief valve at a second hydraulic pressure lower than the first hydraulic pressure when the work mode determining unit determines that the operating mode is the backhoe work mode.

7 Claims, 5 Drawing Sheets

BACKHOE LOADER

CROSS-REFERENCE TO RELATED APPLICATIONS

This application claims priority to Japanese Patent Application No. 2011-172751 filed on Aug. 8, 2011, the disclosure of which is hereby incorporated herein by reference in its entirety.

TECHNICAL FIELD

The present invention relates to a backhoe loader, and particularly to a backhoe loader including a transmission provided with a hydraulic clutch.

BACKGROUND ART

A backhoe loader includes a loader bucket disposed forwards of a vehicle body while including a backhoe disposed rearwards of the vehicle body. Further, an operator's seat disposed in a cab is rotatable while being configured to be oriented forwards during travelling or execution of a work with the loader bucket and be oriented rearwards during execution of a work with the backhoe.

For example, in a backhoe loader described in Japan Laid-open Patent Application Publication No. JP-A-H09-105137, a link is arranged for producing a more flat bucket edge excavation force curve when the loader bucket is actuated from the maximally rolled-back position to the maximally curled position.

On the other hand, Japan Laid-open Patent Application Publication No. JP-A-H62-151654 describes a backhoe loader including a power transmission. Here, a modulation relief valve is disposed between a main gear shift operating valve and a hydraulic pump in the power transmission. Accordingly, smooth gear shifting is implemented while sudden starting with a gear-shifting operation is avoided.

SUMMARY

A backhoe loader is provided with a plurality of hydraulic pumps such as a hydraulic pump for travelling and a hydraulic pump for driving a working unit. The hydraulic pump for travelling is a pump for supplying operating oil to a hydraulic clutch disposed in a transmission. Further, the hydraulic pump for a working unit is a pump for supplying the operating oil to a hydraulic cylinder for driving the working unit.

Incidentally, as described above, the backhoe loader has a chance of executing a work using the front-side loader bucket and a chance of executing a work using the rear-side backhoe. In the work using the front-side loader bucket, the backhoe loader executes the work while travelling. On the other hand, in the work using the rear-side backhoe, the vehicle is stopped and does not execute switching between forward travelling and rearward travelling and switching among speed stages.

From the work situations of the backhoe as described above, the operating oil for travelling is not required while a work is being executed using the rear-side backhoe. However, respective hydraulic pumps are constantly driven in a conventional backhoe loader. Therefore, a large pump loss is caused in driving the respective hydraulic pumps and saving in fuel consumption is thereby obstructed.

It is an object of the present invention to reduce fuel consumption by reducing a load of a hydraulic pump in a backhoe loader.

A backhoe loader according to a first aspect of the present invention includes: a transmission including at least a hydraulic clutch; a cab including an operator's seat allowed to be set in two positions of a forwardly oriented position and a backwardly orientated position; a loader disposed forwards of the cab; a backhoe disposed rearwards of the cab; a hydraulic pump for supplying an operating oil to the hydraulic clutch; a hydraulic circuit that includes a relief valve for setting an intra-circuit hydraulic pressure to be a first hydraulic pressure and supplies the operating oil from the hydraulic pump to the hydraulic clutch; a work mode determining unit configured to determine whether or not an operating mode is a backhoe work mode using the backhoe; and a relief valve controlling unit. The relief valve controlling unit is configured to control a relief pressure of the relief valve at a second hydraulic pressure lower than the first hydraulic pressure when the work mode determining unit determines that the operating mode is the backhoe work mode.

Here, the hydraulic pressure of the hydraulic circuit is reduced by controlling the relief valve when it is determined that a work with the backhoe is being executed. Accordingly, the load of the hydraulic pump for supplying the operating oil to the transmission is reduced during execution of a work with the backhoe. Therefore, fuel consumption can be reduced.

A backhoe loader according to a second aspect of the present invention relates to the backhoe loader of the first aspect, and further includes an operator's seat orientation detecting sensor detecting an orientation of the operator's seat. Further, the work mode determining unit is configured to determine that the operating mode is the backhoe work mode when the operator's seat orientation detecting sensor detects that the operator's seat is backwardly oriented.

The operator's seat is set to be backwardly oriented when a work is executed using the backhoe. Therefore, it is determined that the operating mode is the backhoe work mode when it is detected that the operator's seat is set to be backwardly oriented. It is herein possible to easily and reliably determine that the operating mode is the backhoe work mode.

A backhoe loader according to a third aspect of the present invention relates to the backhoe loader of the second aspect, and wherein the work mode determining unit is configured to determine that the operating mode is the backhoe work mode when it is further detected that an engine is running.

Even when the engine is not running, the operator's seat may be set to be backwardly oriented. In view of this, the backhoe loader of the third aspect is configured to determine that the operating mode is the backhoe work mode when it is detected that the operator's seat is set to be backwardly oriented while the engine is running. Therefore, it is possible to more reliably determine that the operating mode is the backhoe work mode.

A backhoe loader according to a fourth aspect of the present invention relates to the backhoe loader of the third aspect, and wherein the work mode determining unit is configured to determine that the operating mode is the backhoe work mode when it is further detected that a command of supplying the operating oil to the hydraulic clutch is not being outputted.

Here, it is determined that the operating mode is the backhoe work mode when it is detected that the hydraulic pressure is not being supplied to the respective hydraulic clutches in the transmission. Therefore, it is further possible to more reliably determine that the operating mode is the backhoe work mode.

A backhoe loader according to a fifth aspect of the present invention relates to the backhoe loader of the first aspect, and further includes an operator's seat orientation detecting sensor detecting an orientation of the operator's seat. Further, the work mode determining unit is configured to determine that the operating mode is not the backhoe work mode when the operator's seat orientation detecting sensor detects that the operator's seat is not backwardly oriented.

Here, as a work form, an operator may operate the backhoe while the operator's seat is kept set to be forwardly oriented. In such case, a travelling-related trouble such as slippage of the hydraulic clutch or obstruction against turning-on of the hydraulic clutch (transmission of power) is caused when the hydraulic pressure of the operating oil supplied to the transmission is reduced.

In view of this, the backhoe loader of the fifth aspect is configured to determine that the operating mode is not the backhoe work mode when the operator's seat is not backwardly oriented even if the backhoe is allowed to be operated. Therefore, it is possible to avoid troubles such as obstruction against coupling of the hydraulic clutches in the transmission.

A backhoe loader according to a sixth aspect of the present invention relates to the backhoe loader of any of the first to fifth aspects, and wherein the relief valve controlling unit includes a pilot circuit that is disposed between the hydraulic pump and the relief valve and controls the relief valve by means of the hydraulic pressure of the hydraulic circuit.

Here, the relief valve control unit can be implemented with a simple structure.

A backhoe loader according to a seventh aspect of the present invention relates to the backhoe loader of the sixth aspect, and wherein the pilot circuit includes an unload valve configured to: allow draining of the operating oil of the hydraulic circuit when the operating mode is other than the backhoe work mode; and prevent draining of the operating oil of the hydraulic circuit when the operating mode is the backhoe work mode.

Advantageous Effects of Invention

According to the present invention as described above, in the backhoe loader, reduction in fuel consumption can be achieved especially by reducing a load of a hydraulic pump during execution of a work with a backhoe.

DESCRIPTION OF THE EMBODIMENTS

Overall Structure

Figure 1:
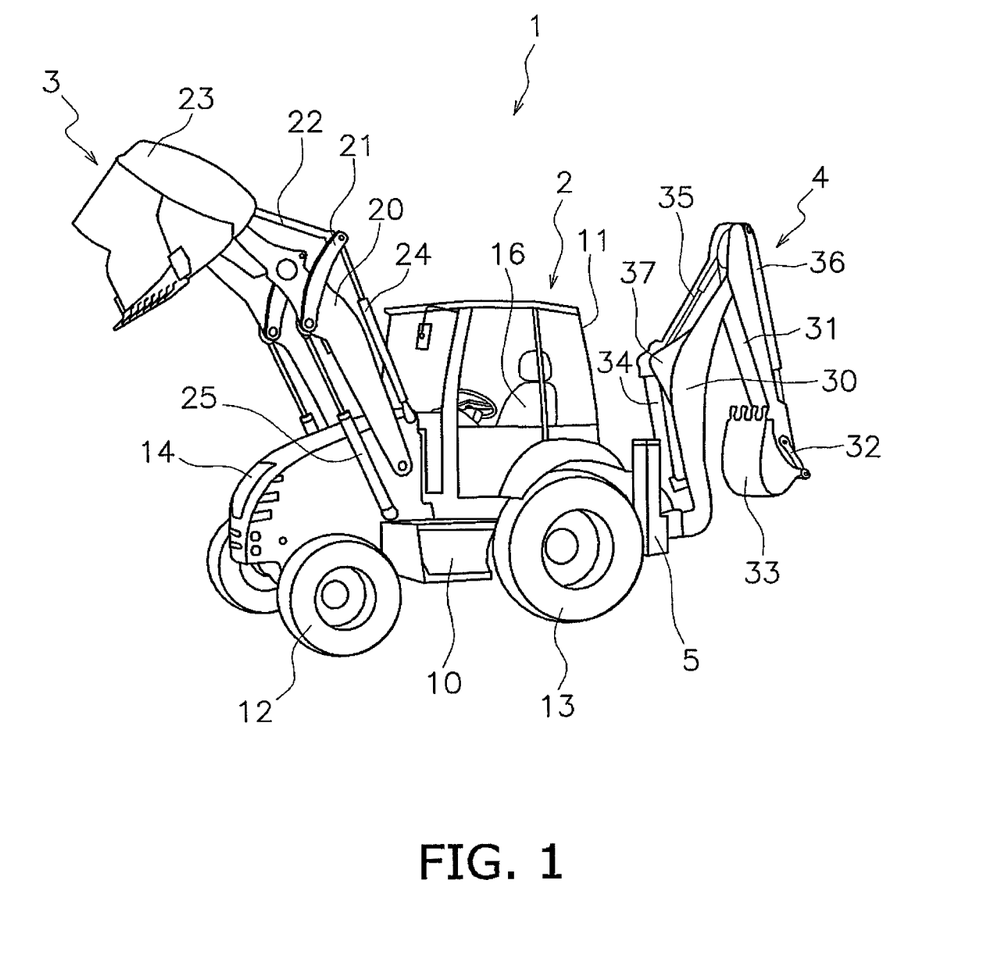
FIG. 1 is an external perspective view of a backhoe loader according to an exemplary embodiment of the present invention.

FIG. 1 illustrates an external view of a backhoe loader 1 according to an exemplary embodiment of the present invention. The backhoe loader 1 is a stand-alone work vehicle that can execute an excavation work and a loading work. The backhoe loader mainly includes a main body 2, a loader 3, a backhoe 4 and right and left stabilizers 5.

The main body 2 includes a frame 10 supporting machineries such as an engine and a transmission 6 (see FIG. 2), a cab 11 mounted on the frame 10, a pair of front wheels 12 and a pair of rear wheels 13. The backhoe loader 1 has a characteristic structure that the diameter of the rear wheel 13 is greater than that of the front wheel 12. Therefore, an axle coupled to the front wheels 12 is disposed in a position lower than that of an axle coupled to the rear wheels 13. The machineries such as the engine and the transmission are covered with an exterior cover 14. An operator's seat 16 on which an operator is seated is disposed inside the cab 11. The operator's seat 16 is rotatable between a forwardly oriented position and a backwardly oriented position. Further, a steering wheel, a variety of pedals and operating members for operating the loader 3 and the backhoe 4 are disposed inside the cab 11.

The engine is mounted in the front part of the frame 10. The engine drives the front wheels 12 and the rear wheels 13 through the transmission and the axles and drives hydraulic pumps for actuating a variety of hydraulic machines.

Figure 2:
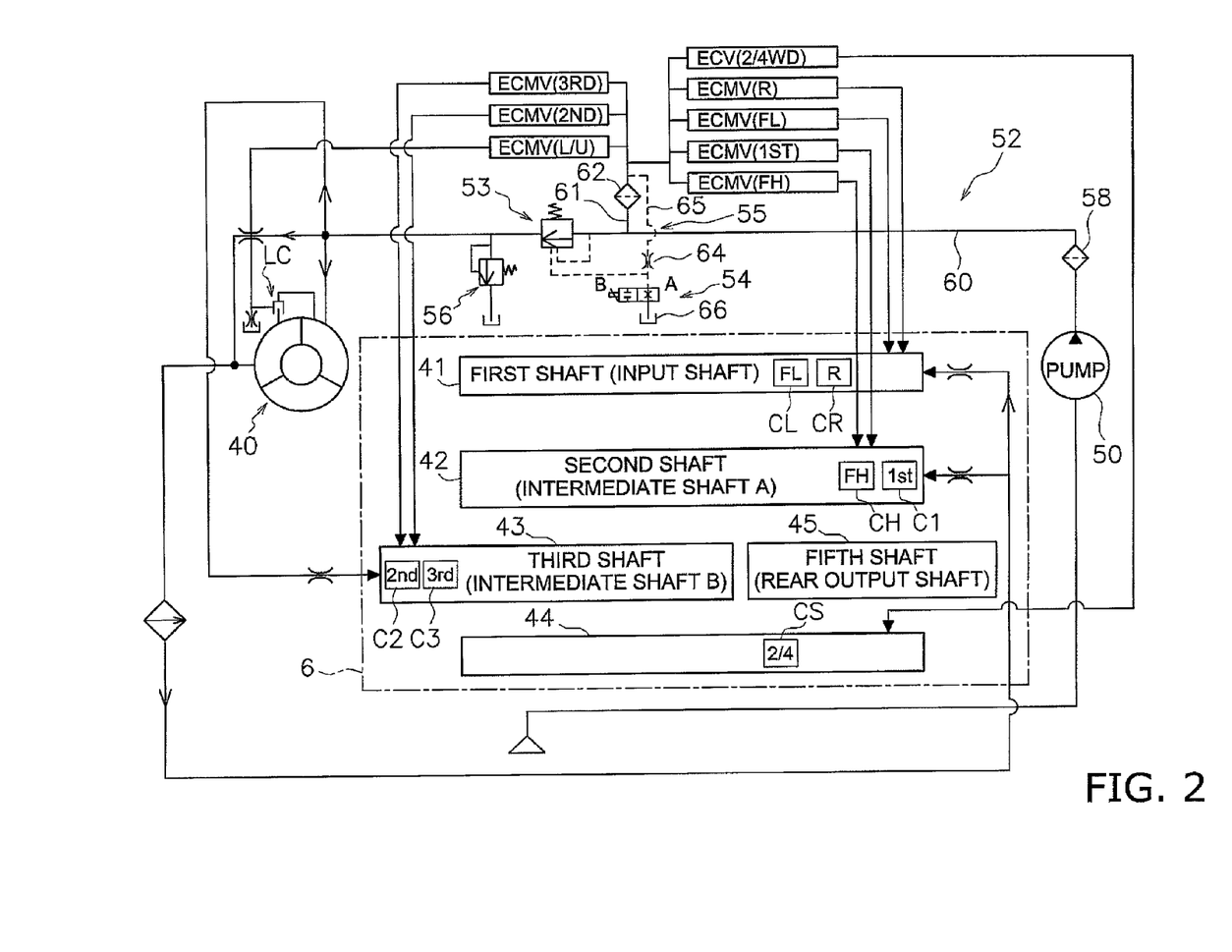
FIG. 2 is a schematic configuration diagram of a transmission and a hydraulic circuit in the backhoe loader.

Although explained below in detail, as illustrated in FIG. 2, the transmission 6 includes a plurality of shafts, and each of the shafts other than a rear output shaft is provided with a hydraulic clutch.

The loader 3 is a working unit disposed forwards of the cab 11 for executing a loading work. The loader 3 includes loader arms 20, brackets 21, links 22, a loader bucket 23, bucket cylinders 24 and arm cylinders 25.

The base ends of the loader arms 20 are rotatably supported by the frame 10, while the loader bucket 23 is rotatably attached to the tip ends of the loader arms 20. The base ends of the brackets 21 are rotatably supported by the loader arms 20, while the tip ends of rods of the bucket cylinders 24 and one ends of the links 22 are rotatably coupled to the tip ends of the brackets 21. The base ends of the bucket cylinders 24 are rotatably supported by the frame 10. Further, the tip ends of the links 22 are rotatably coupled to the bucket 23. The base ends of the arm cylinders 25 are rotatably supported by the frame 10, while the tip ends of rods of the arm cylinders 25 are rotatably coupled to longitudinally intermediate portions of the loader arms 20.

With the aforementioned structure, the loader arms 20 are upwardly rotated when the rods of the arm cylinders 25 are protruded, whereas the loader arms 20 are downwardly rotated when the rods of the arm cylinders 25 are retracted. Further, when the rods of the bucket cylinders 24 are protruded, the brackets 21 are forwardly rotated. Accordingly, the links 22 are forwardly moved and the loader bucket 23 is downwardly rotated. Contrarily, when the rods of the bucket cylinders 24 are retracted, the brackets 21 are backwardly rotated. Accordingly, the links 22 are backwardly moved and the loader bucket 23 is upwardly rotated.

The backhoe 4 is a working unit disposed rearwards of the cab 11 for executing an excavation work. The backhoe 4 includes a boom 30, an arm 31, a bucket link 32, a backhoe bucket 33, a boom cylinder 34, an arm cylinder 35 and a bucket cylinder 36. The base end of the boom 30 is supported by the frame 10 through a bracket (not illustrated in the figures) while being rotatable in the right-and-left direction. The base end of the arm 31 is rotatably coupled to the tip end of the boom 30, while the backhoe bucket 33 is rotatably coupled to the tip end of the arm 31. One end of the boom cylinder 34 is rotatably coupled to a bracket (not illustrated in the figures) fixed to the frame 10, while the other end of the boom cylinder 34 is rotatably coupled to a boom bracket 37 fixed to the boom 30. One end of the arm cylinder 35 is rotatably coupled to the boom bracket 37, while the other end of the arm cylinder 35 is rotatably coupled to the base end of the arm 31. The base end of the bucket cylinder 36 is rotatably coupled to the arm 31, while the tip end of the bucket cylinder 36 is rotatably coupled to the bucket link 32.

With the structure as described above, the boom 30 is rotated downwards when a rod of the boom cylinder 34 is protruded, whereas the boom 30 is rotated upwards when the rod of the boom cylinder 34 is retracted. Further, the arm 31 is rotated downwards when a rod of the arm cylinder 35 is protruded, whereas the arm 31 is rotated upwards when the rod of the arm cylinder 35 is retracted. Moreover, when a rod of the bucket cylinder 36 is protruded, the backhoe bucket 33 is rotated through the bucket link 32 and an opening of the backhoe bucket 33 approaches the arm 31. On the other hand, when the rod of the bucket cylinder 36 is retracted, the backhoe bucket 33 is rotated through the bucket link 32 and the opening of the backhoe bucket 33 is separated away from the arm 31.

It should be noted that the backhoe 4 includes a bracket cylinder for rotating the boom bracket coupling the boom 30 to the frame 10 in the right-and-left direction although not illustrated in the figures. One end of the bracket cylinder is rotatably coupled to the frame 10, whereas the other end of the bracket cylinder is rotatably coupled to the boom bracket. The boom bracket is rotated to one side in the right-and-left direction when a rod of the bracket cylinder is protruded, whereas the boom bracket is rotated to the other side in the right- and left direction when the rod of the bracket cylinder is retracted.

The right and left stabilizers 5 serve to prevent the backhoe loader 1 from falling down by stabilizing the posture of the backhoe loader 1 during execution of a work with the backhoe 4. The right and left stabilizers 5 are respectively disposed on the rear right part and the rear left part of the frame 10. The posture of the backhoe loader 1 can be stabilized in executing an excavation work by causing the stabilizers 5 to make contact with the ground while the stabilizers 5 are laterally stretched on the right and left sides of the backhoe loader 1 and by lifting up the rear part of the main body of the backhoe loader 1 until the rear wheels 13 are separated away from the ground.

Transmission and Hydraulic Circuit

FIG. 2 schematically represents the transmission 6 and a torque converter 40, while representing a hydraulic pump 50 and a hydraulic circuit 52 for supplying the operating oil to the devices.

The transmission 6 includes first to fifth shafts 41 to 45 disposed in parallel to each other. The first shaft 41 is an input shaft to which power is inputted from the engine (not illustrated in the figures). The second shaft 42 and the third shaft 43 are both intermediate shafts. The fourth shaft 44 is a front output shaft coupled to the front wheels 12. The fifth shaft 45 is a rear output shaft coupled to the rear wheels 13. The first shaft 41 is provided with a hydraulic clutch CL for forward travelling at a lower speed stage and a hydraulic clutch CR for rearward travelling. The second shaft 42 is provided with a hydraulic clutch CH for forward travelling at a higher speed stage and a hydraulic clutch C1 for a first speed stage. The third shaft 43 is provided with a hydraulic clutch C2 for a second speed stage and a hydraulic clutch C3 for a third speed stage. The fourth shaft is provided with a hydraulic clutch CS for switching between two-wheel driving and four-wheel driving.

The torque converter 40 includes heretofore known impeller, turbine and stator, and further, includes a lock-up clutch LC.

The hydraulic circuit 52 includes a main relief valve 53, a plurality of electromagnetic proportional control valves ECMV, a single electromagnetic control valve ECV, a pilot circuit 55 including an unload valve 54, and a torque converter relief valve 56.

The main relief valve 53 is connected to the hydraulic pump 50 through a filter 58. The main relief valve 53 controls the operating oil discharged from the hydraulic pump 50 at a predetermined pressure.

The electromagnetic proportional control valves ECMV and the electromagnetic control valve ECV are disposed through a filter 62 on a branch oil path 61 branched from an oil path 60 connecting the hydraulic pump 50 and the main relief valve 53. The plural electromagnetic proportional control valves ECMV supply the operating oil to the plural hydraulic clutches CL, CH, CR and C1 to C3 except for the hydraulic clutch CS for switching between two-wheel driving and four-wheel driving. The electromagnetic control valve ECV supplies the operating oil to the hydraulic clutch CS for switching between two-wheel driving and four-wheel driving.

The pilot circuit 55 is disposed between the branch oil path 61 and the main relief valve 53. Further, the pilot circuit 55 is provided with the unload valve 54 and an orifice 64. The unload valve 54 includes a solenoid and the main relief valve 53 is controlled by turning on and off the solenoid. The orifice 64 is disposed between the unload valve 54 and a branch oil path 62. When the solenoid of the unload valve 54 is turned off, a spool of the unload valve 54 is located in the position of a stage A in FIG. 2, while an oil path 65 of the pilot circuit 55 is connected to a drain 66. Therefore, the hydraulic circuit 52 including the branch oil path 61 is kept at a hydraulic pressure of, for instance, 20 kg/cm$^2$ by the action of the orifice 64. On the other hand, when the solenoid of the unload valve 54 is turned on, the spool of the unload valve 54 is transitioned to a stage B. When the unload valve 54 is transitioned to the stage B, the oil path 65 and the drain 66 are blocked in the pilot circuit 55. Therefore, the hydraulic pressure of the hydraulic circuit 52 instantly acts on the main relief valve 53, and the main relief valve 53 is set in an opened state. Under the condition, the hydraulic pressure of the hydraulic circuit 52 is reduced to a pressure only with a circuit resistance on the downstream side of the main relief valve 53.

The torque converter relief valve 56 is disposed in an oil path between the main relief valve 53 and the torque converter 40, and controls the pressure of the operating oil of the torque converter 40.

It should be noted that either the operating oil branched before reaching the torque converter 40 or the operating oil discharged from the torque converter 40 is supplied as lubricating oil to the respective shafts 41 to 45 through an oil path for the lubricating oil.

Control Block

Figure 3:
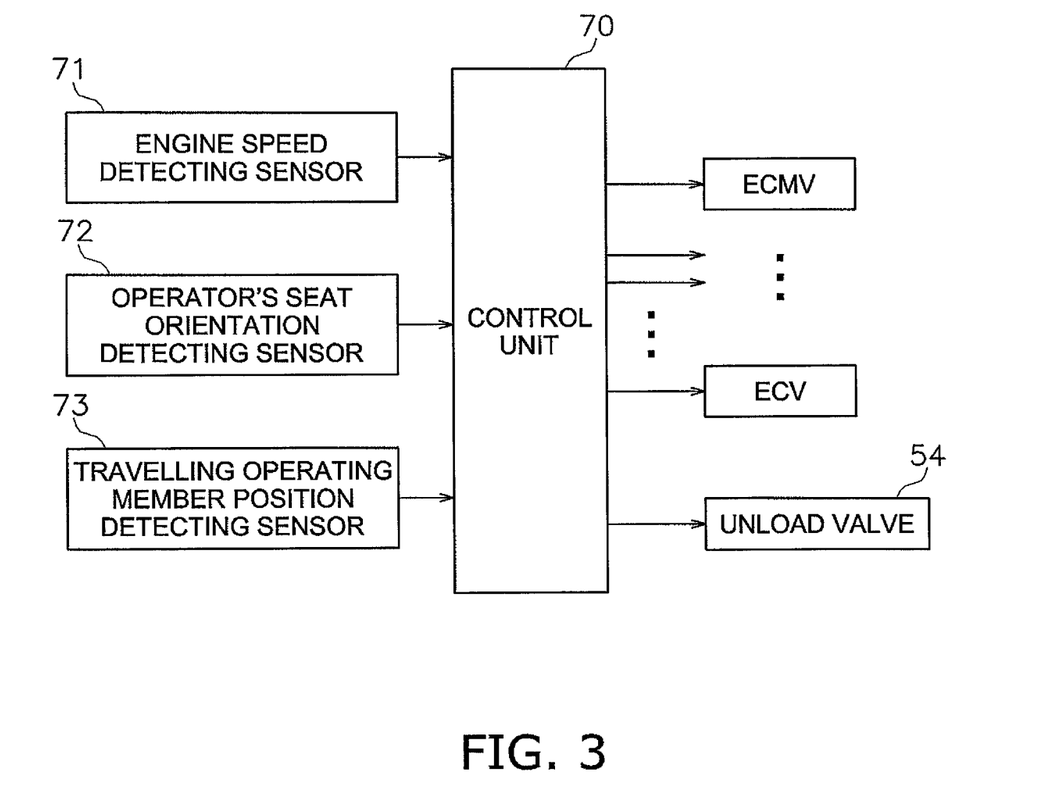
FIG. 3 is a control block diagram for an unload processing.

As represented in FIG. 3, the backhoe loader 1 includes a control unit 70. Sensors connected to the control unit 70 include: an engine speed detecting sensor 71 for detecting whether or not the engine is being activated; an operator's seat orientation detecting sensor 72 for detecting in which of a forward direction and a rearward direction the operator's seat is oriented; and a position detecting sensor 73 regarding the operating member for travelling. The position detecting sensor 73 regarding the operating member for travelling includes sensors for detecting the respective positions of an operating member for switching between forward travelling and rearward travelling, an operating member for switching between two-wheel driving and four-wheel driving, a gear shift lever for switching among gear stages and etc. Further, the respective electromagnetic proportional control valves ECMV, the electromagnetic control valve ECV and the unload valve 54 are connected to the control unit 70. Moreover, in response to signals from the respective sensors, the control unit 70 is configured to output control signals to the respective electromagnetic proportional control valves ECMV, the electromagnetic control valve ECV and the unload valve 54 for controlling turning on/off of the plural hydraulic clutches disposed on the respective shafts 41 to 44 in the transmission 6 and for controlling the unload valve 54.

Control Processing

Figure 4:
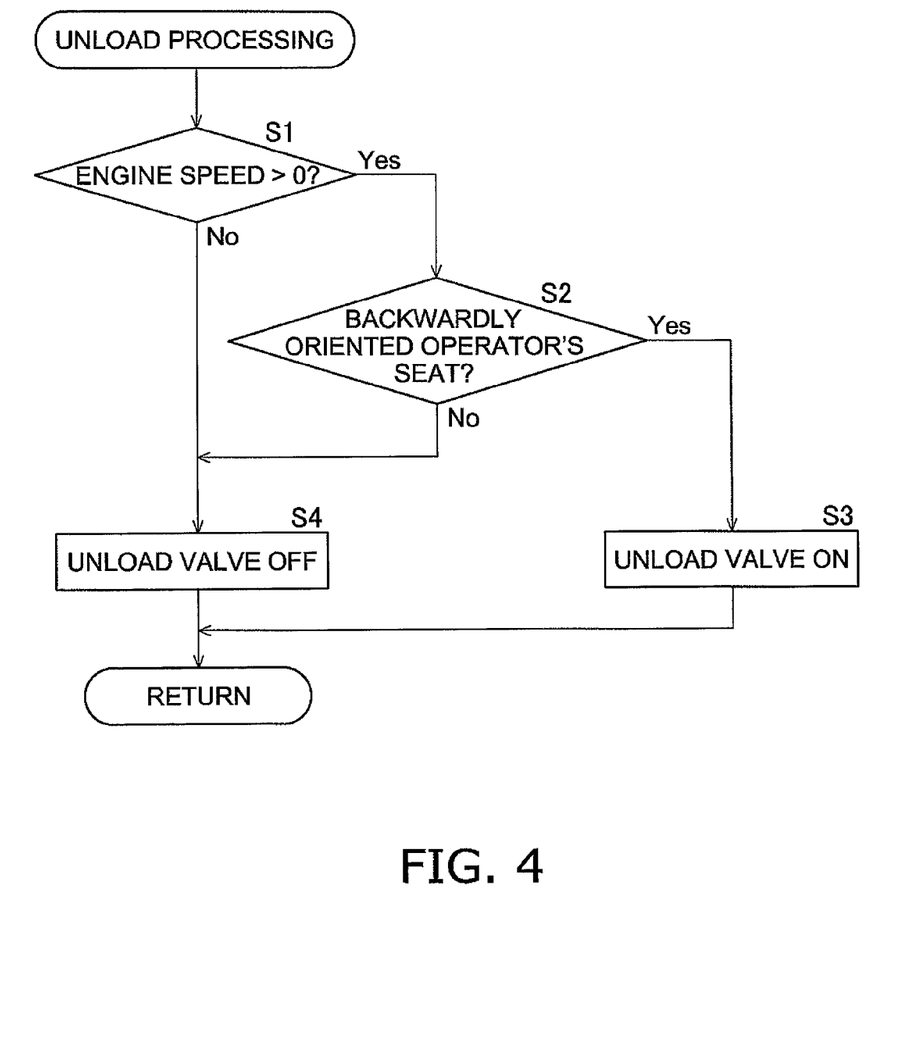
FIG. 4 is a control flowchart of the unload processing.

FIG. 4 represents a flowchart for executing an unload processing, i.e., a processing for reducing the hydraulic pressure in the hydraulic circuit during execution of a backhoe work. The unload processing will be hereinafter explained based on the flowchart.

First, when an operating mode is not a backhoe work mode, for instance, when a work is executed with the loader, no command is being outputted from the control unit 70 to the solenoid of the unload valve 54. In this case, the solenoid of the unload valve 54 is being turned off while the spool thereof is located in the stage A. In this case, the hydraulic pressure, set in the main relief valve 53 (e.g., 20 kg/cm$^2$), is set for the branch oil path 61 side of the orifice 64 in the pilot circuit 55. On the other hand, the operating oil is flown to the drain 66 through the unload valve 54 on the unload valve 54 side of the orifice 64. The hydraulic pressure does not thereby substantially act on the spool of the main relief valve 53. Therefore, the hydraulic circuit 52 is kept at the hydraulic pressure set in the main relief valve 53.

In the unload processing, it is determined in Step S1 whether or not the engine is running based on a detection signal from the engine speed detecting sensor 71. Further, it is determined in Step S2 whether or not the operator's seat is backwardly oriented based on a detection signal from the operator's seat orientation detecting sensor 72. Either a limit switch or a proximity switch is used as the operator's seat orientation detecting sensor 72. Obviously, a potentiometer may be used as the operator's seat orientation detecting sensor 72. In this case, it is required to specify an angle for defining the backward orientation.

When determination results are YES in respective Steps S1 and S2, the processing proceeds to Step S3 and a turning-on command is outputted to the solenoid of the unload valve 54. The unload valve 54 is accordingly transitioned to the stage B. When the unload valve 54 is transitioned to the stage B, the connection of the pilot circuit 55 to the drain 66 is blocked. Therefore, the hydraulic pressure of the hydraulic circuit 52 instantly acts on the main relief valve 53 through the pilot circuit 55. Accordingly, the spool of the main relief valve 53 is moved and the main relief valve 53 is opened. Therefore, the hydraulic pressure of the hydraulic circuit 52 is changed into a hydraulic pressure only with resistance in the hydraulic circuit disposed downstream of the main relief valve 53. Thus, the load of the hydraulic pump 50 is remarkably reduced.

It should be noted that the unload processing is executed at a predetermined cycle. Therefore, the processing proceeds to Step S4 when a determination result is NO in either of Steps S1 and S2 while the unload valve 54 is located in the stage B. In Step S4, the solenoid of the unload valve 54 is turned off and is accordingly transitioned to the stage A. Therefore, as described above, the hydraulic pressure set in the main relief valve 53 (e.g., 20 kg/cm$^2$) is set for the hydraulic circuit 52.

Now, in a type of work, an operator operates the backhoe while the operator's seat is kept set in the forward orientation. In this case, the backhoe is being selected with a switch for selecting either of the loader bucket and the backhoe. However, the operator's seat is set in the forward orientation. Therefore, a backhoe work cannot be fully executed even if the backhoe can be operated. Accordingly, such situation is not considered as the backhoe work mode.

The operator's seat orientation detecting sensor 72 is configured to be able to detect the forward orientation of the operator's seat. When it is detected that the operator's seat is forwardly oriented, travelling of the backhoe loader is allowed. Therefore, in the present exemplary embodiment, the hydraulic pressure of the operating oil supplied to the transmission is reduced only when the rearward orientation of the operator's seat is detected. Accordingly, occurrence of travelling-related troubles is prevented, including slippage of the hydraulic clutches, obstruction against turning-on of the hydraulic clutches (transmission of power) or etc. From a converse perspective, when the operator's seat orientation detecting sensor 72 detects that the operator's seat is not backwardly oriented (i.e., it is detected that the detected value is turned OFF), it is determined that an operating mode is not the backhoe work mode and the hydraulic pressure of the operating oil supplied to the transmission is configured not to be reduced.

Features (1) When it is determined that a work using the backhoe 4 is being executed, the main relief valve 53 is controlled to reduce the hydraulic pressure of the hydraulic circuit 52. Therefore, the load of the hydraulic pump 50 is reduced during execution of a work with the backhoe 4, and accordingly, fuel consumption can be reduced.

(2) It is determined that an operating mode is the backhoe work mode when it is determined that the engine is running and the operator's seat is backwardly oriented. Therefore, it is possible to easily and reliably determine that an operating mode is the backhoe work mode.

(3) Even when a work is executed using the backhoe while the operator's seat is forwardly oriented during execution of a work with the loader 3, the operator's seat is not backwardly oriented, and therefore, it is determined that an operating mode is not the backhoe work mode. It is thereby possible to avoid troubles such as obstruction against coupling of the respective hydraulic clutches in the transmission 6 during execution of a work with the loader.

(4) The pilot circuit 55 is provided between the hydraulic pump 50 and the main relief valve 53 and is configured to control the main relief valve 53. Therefore, the main relief valve 53 can be controlled with a simple structure.

Other Exemplary Embodiments

The present invention is not limited to the exemplary embodiment as described above, and a variety of changes or modifications can be herein made without departing from the scope of the present invention.

In the aforementioned exemplary embodiment, the pilot circuit is provided and configured to control the main relief valve. However, the configuration of controlling the main relief valve is not limited to that in the exemplary embodiment.

Figure 5:
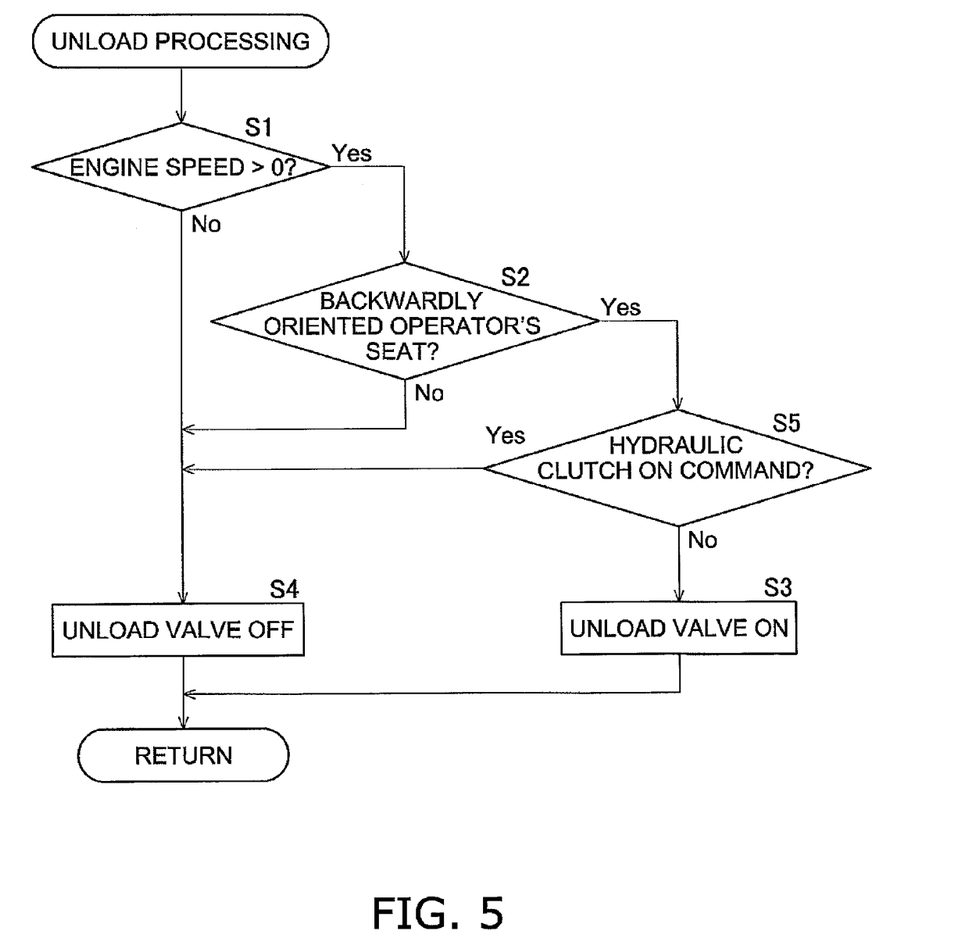
FIG. 5 is a diagram corresponding to FIG. 4 according to another exemplary embodiment of the present invention.

Further, the conditions for determining the backhoe work mode are not limited to those in the aforementioned exemplary embodiment. For example, in addition to the conditions in the aforementioned exemplary embodiment, a condition may be added that a command of turning on a hydraulic clutch is not being outputted from the control unit to the electromagnetic proportional control valves and the electromagnetic control valve. FIG. 5 represents a control flowchart of the case.

Here, Step S3 similarly to that in FIG. 4 is executed when determination results are YES in conditions (Steps S1 and S2) similar to those in FIG. 4, and further, when it is determined in Step S5 that a command of turning on a hydraulic clutch is not being outputted to the electromagnetic proportional control valves ECMV and the electromagnetic control valve ECV. Further, even if determination results are YES in Steps S1 and S2, Step S3 is not executed when a command of turning on a hydraulic clutch is being outputted to the electromagnetic proportional control valves ECMV and the electromagnetic control valve ECV.

In such exemplary embodiment, it is possible to reliably prevent a drawback during execution of a work with the loader, such as slippage of the hydraulic clutches during travelling or obstruction against turning-on of the hydraulic clutches.

In the aforementioned exemplary embodiment, the hydraulic pressure of the operating oil supplied to the transmission is reduced only when the operator's seat orientation detecting sensor 72 detects that the operator's seat is backwardly oriented. However, the hydraulic pressure of the operating oil supplied to the transmission may be configured not to be reduced when the operator's seat orientation detecting sensor 72 detects that the operator's seat is forwardly oriented. Obviously, the operator's seat is not backwardly oriented when being forwardly oriented. Therefore, when the operator's seat orientation detecting sensor 72 detects that the operator's seat is not backwardly oriented, it could be obviously determined that an operating mode is not the backhoe work mode and the hydraulic pressure of the operating oil supplied to the transmission is configured not to be reduced.

Further, the operator's seat orientation detecting sensor 72 may be caused to detect that the operator's seat is not backwardly oriented when the operator's seat is located in a predetermined intermediate angular position between the backwardly oriented position and the forwardly oriented position. When it is detected that the operator's seat is not backwardly oriented, it is determined that an operating mode is not the backhoe work mode and the hydraulic pressure of the operating oil supplied to the transmission may be configured not to be reduced.

In the backhoe loader of the illustrated embodiment, reduction in fuel consumption can be achieved especially by reducing a load of the hydraulic pump during execution of a work with a backhoe.

The invention claimed is:

1. A backhoe loader comprising;
a transmission including at least a hydraulic clutch;
a cab including an operator's seat allowed to be set in two positions of a forwardly oriented position and a backwardly orientated position;
a loader disposed forwards of the cab;
a backhoe disposed rearwards of the cab;
a hydraulic pump configured to supply an operating oil to the hydraulic clutch;
a hydraulic circuit including a relief valve configured to set an intra-circuit hydraulic pressure to be a first hydraulic pressure, the hydraulic circuit being configured to supply supplying the operating oil from the hydraulic pump to the hydraulic clutch;
a work mode determining unit configured to determine whether or not an operating mode is a backhoe work mode using the backhoe; and
a relief valve controlling unit configured to control a relief pressure of the relief valve at a second hydraulic pressure lower than the first hydraulic pressure when the work mode determining unit determines that the operating mode is the backhoe work mode.

2. The backhoe loader recited in claim 1, further comprising
an operator's seat orientation detecting sensor configured to detect an orientation of the operator's seat,
wherein the work mode determining unit is configured to determine that the operating mode is the backhoe work mode when the operator's seat orientation detecting sensor detects that the operator's seat is backwardly oriented.

3. The backhoe loader recited in claim 2, wherein
the work mode determining unit is configured to determine that the operating mode is the backhoe work mode when it is further detected that engine is running.

4. The backhoe loader recited in claim 3, wherein
the work mode determining unit is configured to determine that the operating mode is the backhoe work mode when it is further detected that a command of supplying the operating oil to the hydraulic clutch is not being outputted.

5. The backhoe loader recited in claim 1, further comprising
an operator's seat orientation detecting sensor configured to detect an orientation of the operator's seat,
wherein the work mode determining unit is configured to determine that the operating mode is not the backhoe work mode when the operator's seat orientation detecting sensor detects that the operator's seat is not backwardly oriented.

6. The backhoe loader recited in claim 1, wherein
the relief valve controlling unit includes a pilot circuit disposed between the hydraulic pump and the relief valve, the pilot circuit being configured to control the relief valve by the hydraulic pressure of the hydraulic circuit.

7. The backhoe loader recited in claim 6, wherein
the pilot circuit includes an unload valve configured to allow draining of the operating oil of the hydraulic circuit when the operating mode is other than the backhoe work mode, and to prevent draining of the operating oil of the hydraulic circuit when the operating mode is the backhoe work mode.

* * * * *